United States Patent [19]

Jakab

[11] Patent Number: 5,333,196
[45] Date of Patent: Jul. 26, 1994

[54] CURRENT LIMITING BATTERY FEED ARRANGEMENT

[75] Inventor: Gyula Jakab, Nepean, Canada

[73] Assignee: Northern Telecom Limited, Montreal, Canada

[21] Appl. No.: 35,581

[22] Filed: Mar. 23, 1993

Related U.S. Application Data

[63] Continuation-in-part of Ser. No. 684,784, Apr. 15, 1991, abandoned.

[51] Int. Cl.$^5$ .......................................... H04M 19/00
[52] U.S. Cl. .................................... 379/413; 379/399; 379/412; 379/402; 379/404
[58] Field of Search ............... 379/399, 413, 412, 402, 379/403, 404; 323/908, 352, 353, 354; 361/93

[56] References Cited

U.S. PATENT DOCUMENTS 4,560,834 12/1985 Huft ....................................... 179/16
5,010,293 4/1991 Ellersick ............................. 323/278
5,138,658 8/1992 Carter et al. ......................... 379/413

FOREIGN PATENT DOCUMENTS 2224909A 5/1990 United Kingdom .

Primary Examiner—James L. Dwyer
Assistant Examiner—Paul A. Fournier
Attorney, Agent, or Firm—Foley & Lardner

[57] ABSTRACT

A current limiting circuit in a battery feed arrangement provides a variable DC resistance for limiting subscriber loop current to a threshold value. The current limiting circuit also presents a low AC impedance so that no imbalance is introduced between tip and ring leads of the subscriber loop. The current limiting component is a low ON resistance power MOSFET in the ring side of the battery feed arrangement. The current limiting circuit is self protecting in the event of lightning strikes and AC power signals either induced or short-circuited.

8 Claims, 4 Drawing Sheets

CURRENT LIMITING BATTERY FEED ARRANGEMENT

This application is a continuation-in-part of Application Ser. No. 07/684,784, filed Apr. 15, 1991.

This invention relates to battery feed for a telephone subscriber loop interface and is particularly concerned with limiting loop current.

BACKGROUND OF THE INVENTION

Most telephone sets draw DC current from the subscriber loop that connects them to the central office (CO). For satisfactory operation, the telephone set requires a current in the range of 18 mA to 50 mA. The DC loop current is provided by the central office battery, whose terminals are typically coupled to the subscriber loop via two battery feed resistors. The DC resistance measured between the TIP and RING of the subscriber loop (including the telephone set) typically is in the range of 100 to 1900 ohms and depends upon the length of the subscriber loop. To provide sufficient loop current for telephone operation with the longest subscriber loop, the value of the battery feed resistors is typically limited to 200 ohm each. In this case, the loop current is $I_{loop}=52V/(400+1900)=22.6$ mA, which is above the minimum current required for proper operation. In the case of a short subscriber loop, one having a resistance of 100 ohm, the loop current is $I_{loop}=52V/(400+100)=104$ mA, which exceeds the desired range of loop current for proper telephone set operation.

It is desirable to provide a battery feed arrangement capable of limiting the loop current in the case of a short subscriber loop. A circuit to limit the loop current would have to meet the following requirements: provide variable DC resistance to limit the loop current; provide low AC impedance to meet the voice frequency requirements of the subscriber line interface; and withstand, without further protection, AC signals appearing at the TIP and RING and resulting from lightning strikes on the loop, AC power conductor induction, and AC power conductor short-circuit.

There have been attempts to introduce current limit circuits with the battery-feed. For example, John M. Hurt in U.S. Pat. No 4,560,834 issued Dec. 24, 1985, teaches an active current limiter in only the ring side of a telephone circuit. While the arrangement taught by Hurt successfully limits loop current to the desired range, the presence of certain components within the arrangement may prevent it from meeting all of the requirements listed above.

SUMMARY OF THE INVENTION

An object of the present invention is to provide an improved current limiting battery feed arrangement.

In accordance with the present invention there is provided a battery feed arrangement for a telephone subscriber loop comprising: inputs for connection to power supply terminals; outputs for connection to a subscriber loop; a first battery feed resistor connected between one o input and one output; a second battery feed resistor, having a value less than the first battery feed resistor, connected to the other output; a power FET having a control terminal and a controllable DC resistive path series connected with the second battery feed resistor and coupled to the other input; a capacitor connected between the control terminal and the resistive path of the power FET for a low impedance path for AC signals applied at the other output; and a control circuit connected to the control terminal of the power FET and having a loop current sensing subcircuit and a biasing subcircuit for providing a control voltage to the power FET in dependence upon the loop current; the control voltage having a first value for maintaining the controllable resistive path in a low resistance state when the loop current is below a predetermined threshold and a second value for increasing the controllable resistive path to a higher resistance state to maintain the loop current at the predetermined threshold.

Advantages of the present invention are a variable DC resistance to limit subscriber loop current and a low AC impedance to meet the voice frequency requirements of the subscriber line interface and an ability to withstand AC signals appearing at connections to the subscriber loop due to lightning strikes, AC induction and AC power shortcircuits, without further protection.

BRIEF DESCRIPTION OF THE DRAWINGS

The present invention will be further understood from the following description with reference to the drawings in which.

Similar references are used in different figures to denote similar components.

DETAILED DESCRIPTION

Figure 1:
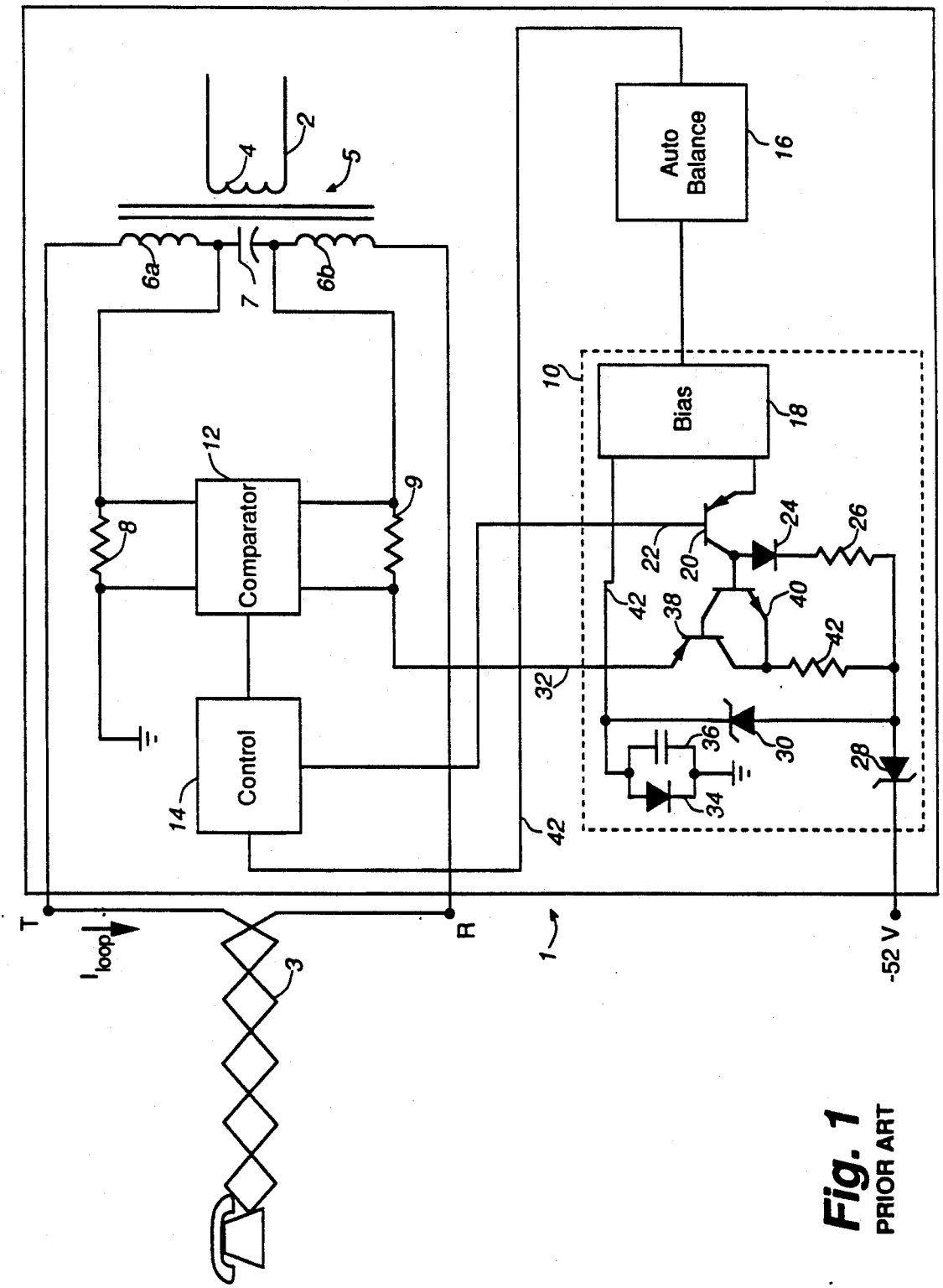
FIG. 1 illustrates a known battery feed arrangement including a current limiting circuit.

Referring to FIG. 1, there is illustrated a known battery feed arrangement having a current limiting circuit in the ring side. The circuit of FIG. 1 is taught by J. M. Hurt in U.S. Pat. No. 4,560,834, issued Dec. 24, 1985. As in typical battery feed arrangements, the central office includes a line interface circuit 1 for interconnecting the line 2 with the subscriber loop 3. The line 2 terminates in a winding 4 of a transformer 5. Tip and Ring sides of loop 3 are connected to opposite halves 6a and 6b of a split winding 6 of transformer 5. The two winding halves 6a and 6b are joined together by a capacitor 7. The junction of capacitor 7 and winding half 6a is connected to ground through a 200 ohm resistor 8 and the junction of capacitor 7 and winding half 6b is typically connected to a −52 volt battery through a further 200 ohm resistor 9. However, in FIG. 1 a current limiter 10 is placed between the −52 volt battery and the resistor 9. A comparator 12 has inputs connected to both sides of the battery feed resistors 8 and 9 and an output connected to a control circuit 14. The control circuit 14 is connected to the current limiter 10 and an auto balance circuit 16.

The current limiter 10 includes a bias circuit 18 having an input connected to the auto balance circuit 16 and two outputs. One output of the bias circuit 18 is connected to a transistor 20 via its emitter and its base is connected to the control circuit 14 via a lead 22. The transistor 20 is connected to the −52 volt battery via its collector, a diode 24, a resistor 26 and a zener diode 28. The zener diode 28 is connected to the battery feed resistor 9 via a zener diode 30 and a lead 32. The lead 32 is also connected to a diode 34 and a capacitor 36, parallel connected to ground, and to a transistor 38 via its emitter. A transistor 40 has its base connected to the collector of transistor 20, its emitter connected to the collector of transistor 38 and its collector connected to the base of transistor 38. The emitter of transistor 40 and the collector of transistor 38 are connected via a resistor 42 to the zener diode 28. The other output of the bias circuit 18 is connected via a lead 44 to a node of the lead 32 and the battery feed resistor 9. The control circuit 14 is connected to the auto balance circuit 16 via a lead 46.

In operation, the current limiter 10 maintains the loop current within the desired range of 18 mA to 50 mA. However, several of the components used in the current limiter may cause problems in actual telephone subscriber loop application. Firstly, when the subscriber loop is in the 'ON-HOOK' state the diode 28 and the transistor 38 contribute to a voltage drop of 1.2 volts between the −52 volt battery input and the R lead. This is not compatible with maintenance terminating units (MTU) which are widely used in telephone loops. The MTU requires a voltage of −42.75 volts on the R lead at a battery voltage of −42.75 volts. The circuit of FIG. 1 would provide a voltage of −42.75+1.2=−41.55 volts. Secondly, with the components used, is that an AC current induced to the R lead is rectified by the diode 28 and the transistor 38 to produce a discharge for the central office battery. Finally, the node between the lead 32 and the battery feed resistor 9 is not low impedance when there is no current flowing, as in the 'ON-HOOK' state. This may make the circuit unsuitable for voice frequency (VF) transmission in the 'ON-HOOK' state, which is a widely used signalling technique.

Further, the current limiter 10 of FIG. 1 is not self-protecting against lightning strikes and AC surges, rather it uses protection in the form of zener diodes 28 and 30 and diode 34.

Thus the circuit of FIG. 1, while meeting the first criterion set forth hereinabove, may not meet the second two, namely, provide a low AC impedance and withstand, without further protection, lightning strikes and AC surges.

Figure 2:
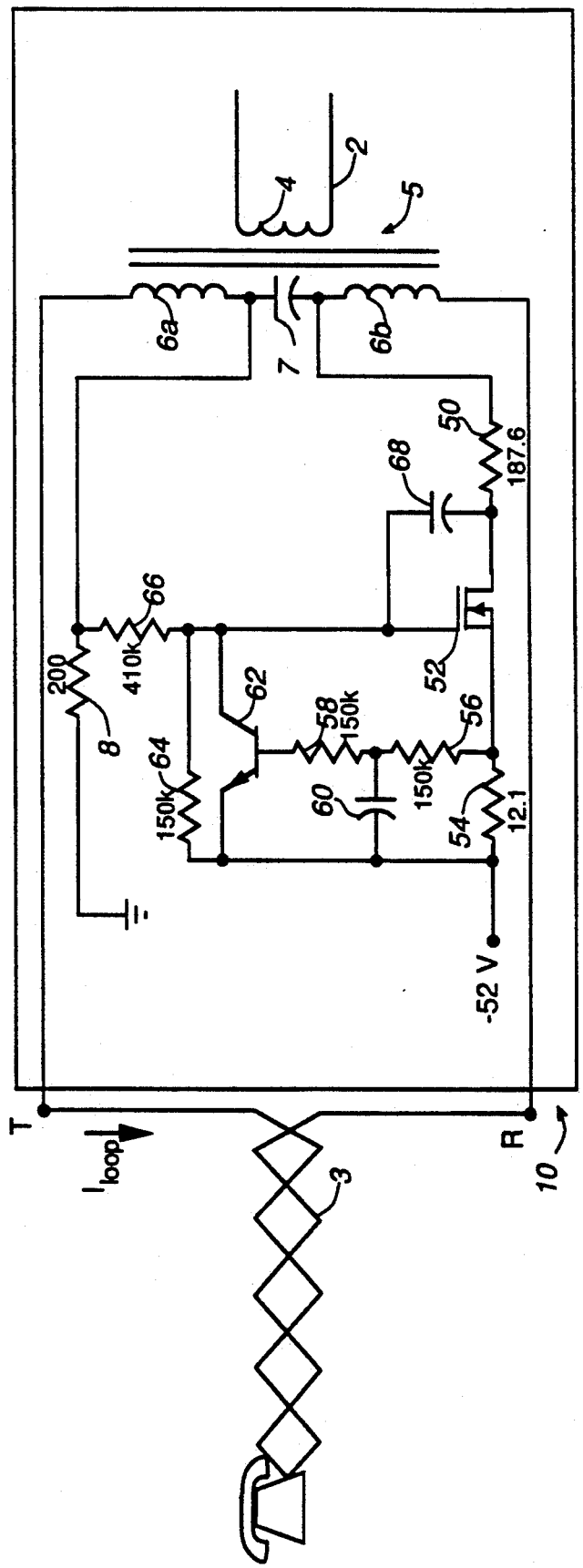
FIG. 2 schematically illustrates a battery feed arrangement including a current limiting circuit in accordance with a first embodiment of the present invention.

Referring to FIG. 2, there is schematically illustrated a battery feed arrangement in accordance with a first embodiment of the present invention. The central office includes a line interface circuit 10, which in common with the prior art circuit of FIG. 1, includes a transformer 5 with winding 4 connected to the line 2, split windings 6a and 6b connected to the TIP and RING sides respectively of the subscriber loop 3 and a capacitor 7 connected between windings 6a and 6b.

As with the prior art arrangement, the junction of winding 6a and capacitor 7 is connected to ground through a 200 ohm resistor 8. However, the 200 ohm resistor 9 and current limiter 10 of the prior arrangement are replaced with a current limit circuit in series with a loop feed resistor 50 having a resistance of 187.6 ohms.

The current limit circuit includes a low ON resistance power MOSFET 52 and a control arrangement coupled thereto. The control arrangement includes a 12.1 ohm current sensing resistor 54, a low pass filter having 150 kohm resistors 56 and 58 and a 0.1 μF capacitor 60, a bipolar transistor 62, and a voltage divider including resistors 64 and 66. The drain of the power MOSFET 52 is connected to the resistor 50 and the source of power MOSFET 52 is connected through the 12.1 ohm current sensing resistor 54 to the −52 volt battery. The low pass filter, comprising 150 kohm resistors 56 and 58 and a 0.1 μF capacitor 60, is connected between the source of FET 52 and the base of bipolar transistor (or small signal FET) 62 connected to control the gate of FET 52. DC bias for the gate of FET 52 is provided by the 150 kohm resistor 64 connected effectively between the gate and −52 volt battery and the 410 kohm resistor 66 connected between the gate and the 200 ohm resistor 8. A 0.1 μF capacitor 68 is connected between the drain and gate of FET 52.

In operation, with no loop current flowing, i.e., subscriber's telephone is 'ON-HOOK' the power FET 52 is held ON, in a saturated mode, by a bias voltage of approximately 10 volts across the resistor 64. The power FET 52 has an ON resistance of approximately 0.3 ohm, hence the total resistance on the ring side of the battery feed circuit, provided by resistors 50 and 54 and the power FET 52, is 200 ohm and is balanced with respect to the tip side whose resistance of 200 ohm is provided by the resistor 8. As the saturated power FET 52 appears as a small resistance to both DC and AC signals, lightning strikes on the loop and AC power signals in the loop, either induced or due to short-circuits to power conductors, do not damage the power FET during the typically short time period required for subscriber loop overvoltage protection to take effect.

With a loop current flowing, i.e., subscriber's telephone is 'OFF-HOOK', a voltage drop develops across the resistor 54. If the loop current remains within the normal range of 18 mA to approximately 50 mA, the voltage drop across the resistor 54 remains below $V_{be}=0.6$ V for the transistor 62 and the power FET 52 remains in the saturated mode. If the loop current attempts to exceed a predetermined threshold value, chosen to be 49.5 mA in the present embodiment, which is approximately the upper end of the normal loop current range, the voltage drop across the resistor 54 reaches $V_{be}=0.6$ volts for the transistor 62, which begins to be turned on. The turning on of transistor 62 reduces the gate voltage of power FET 52 causing its DC resistance to increase to maintain a loop current of 49.5 mA, in which case the battery feed circuit operates in a current limiting mode. In case of a short cable (100 ohms) the loop current would be:

$I_{loop}$max=52V/(100+400)=104 mA The transistor 62 increases the source to drain resistance of FET 52 to approximately 550 ohms, thus limiting the loop current to $I_{loop}$=0.6V/12.1=49.5 mA.

Capacitor 60 filters the AC components of the signal fed to the base of transistor 62.

While the current limiting circuit controls the DC current by increasing the DC resistance of the power FET 52, its AC impedance remains low as is explained hereinbelow in reference to FIG. 3.

Figure 3:
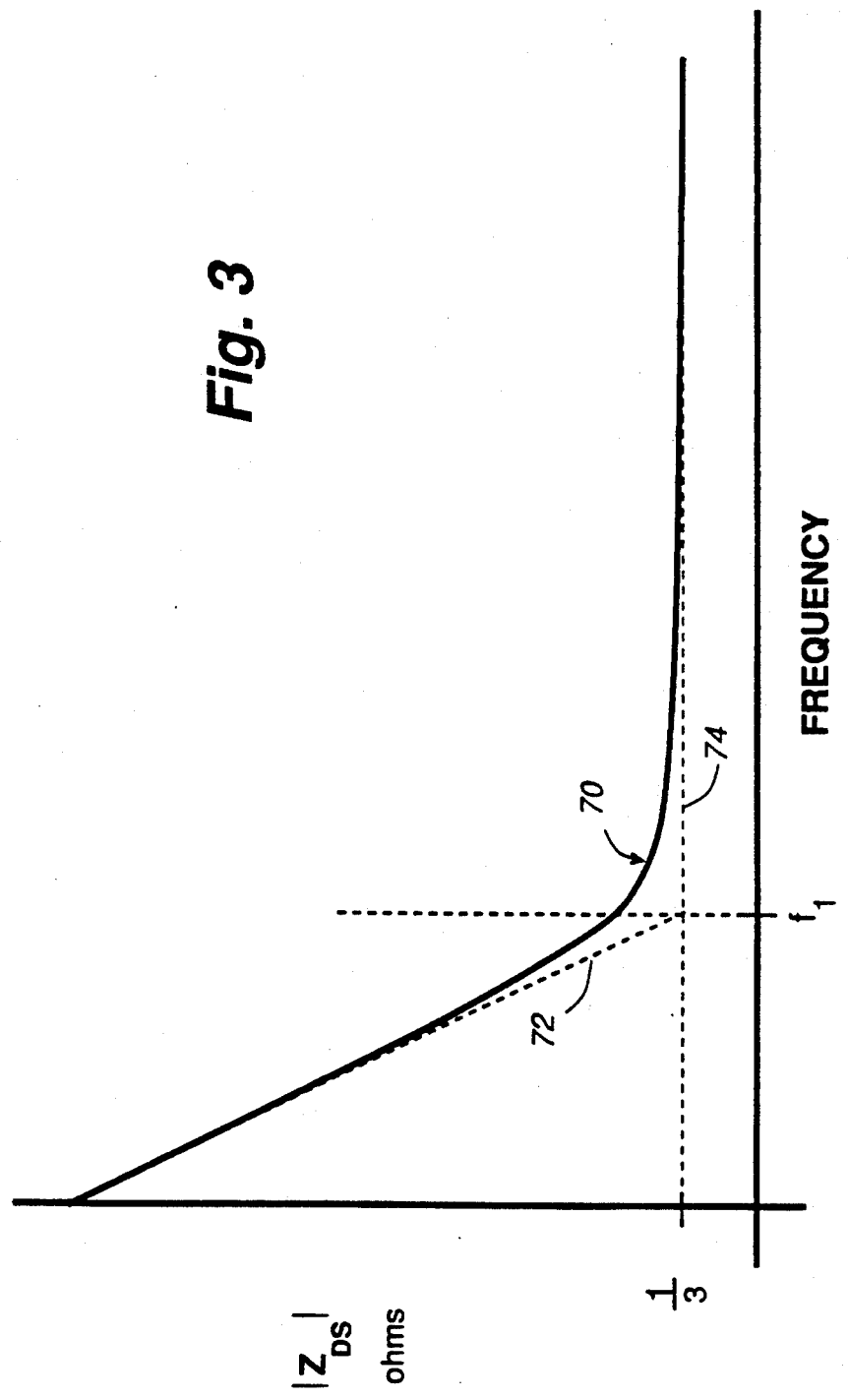
FIG. 3 graphically illustrates the impedance of the current limiting circuit of FIG. 2 as a function of complex frequency.

Referring to FIG. 3, there is graphically illustrated the impedance of the ring side of the battery feed circuit in current limiting mode as a function of complex frequency s. A curve 70 represents the drain to source impedance $Z_{ps}$ which for relatively low frequency signals (less than 4 kHz) is given by equation 1:

$$Z_{DS}=(1+1/(SR'_{64}C_{68}))/g_m \quad (EQ. 1)$$

where $R'_{64}=R_{64}$ and $R_{66}$ in parallel $=109$ k$\Omega$, $C_{68}=0.1$ $\mu$F and the transconductance of FET 52 is $g_m=3$ mhos. The curve 70 representing the impedance has two asymptotes 72 and 74. The asymptote 74 is substantially horizontal and represents an impedance of about 0.33 ohm. The asymptotes 72 and 74 intersect at a frequency $f_1$ approximately equal to 15 Hz. Thus, in the current limiting mode the battery feed circuit presents a maximum current limiting resistance of 550 ohm to the DC loop current and while maintaining a low impedance of about 0.33 ohm to any AC signal above the cutoff frequency $f_1$ of about 15 Hz. The capacitor 68 and resistors 64 and 66 are selected to give the cutoff frequency of approximately 15 Hz. Thus, in the current limiting mode, the battery feed circuit is current limiting for DC, balanced for voice frequency and AC power signals, and provides a low impedance to lightning and AC power signals. An example of a suitable power FET is MTP10N15 by Motorola.

Figure 4:
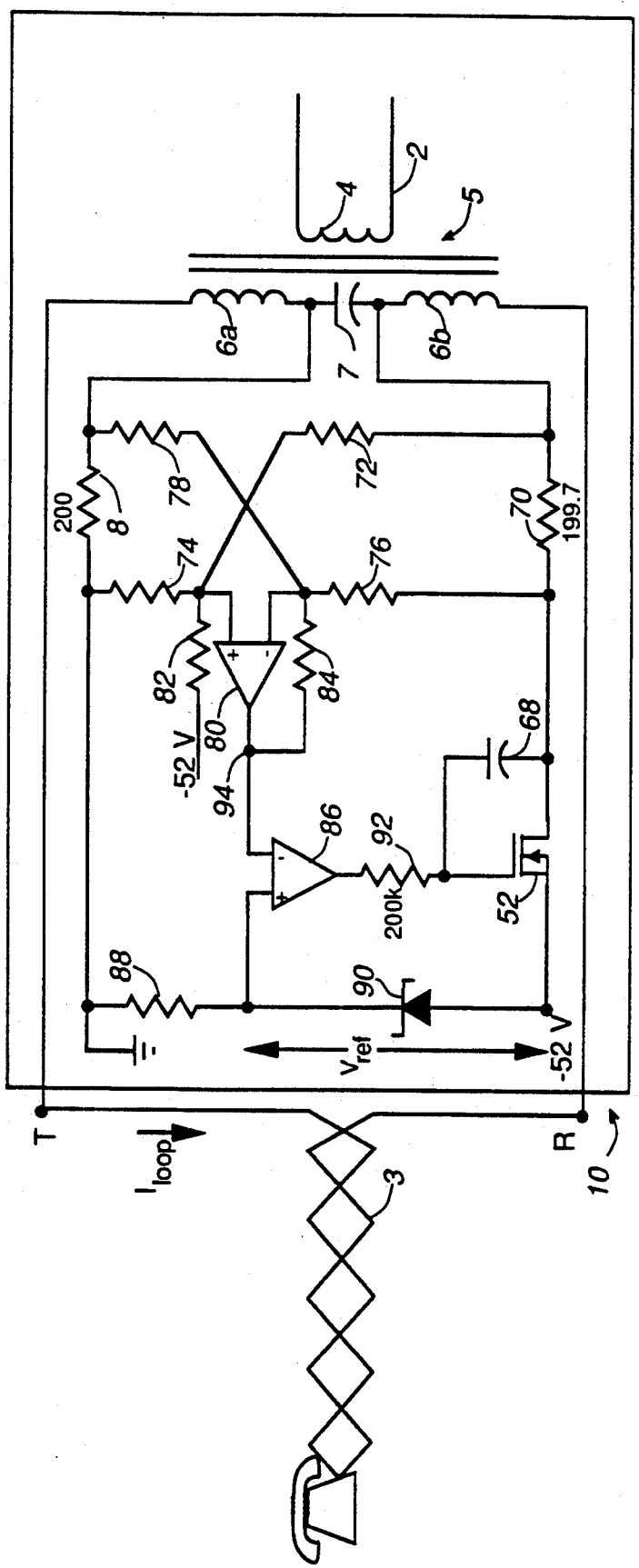
FIG. 4 schematically illustrates a battery feed arrangement in accordance with a second embodiment of the present invention.

Referring to FIG. 4, there is schematically illustrated a battery feed arrangement in accordance with a second embodiment of the present invention. The central office includes a line interface circuit 10, which in common with the prior art circuit of FIG. 1 and the embodiment of FIG. 2, includes a transformer 5 with winding 4 connected to the line 2, split windings 6a and 6b connected to the TIP and RING sides respectively of the subscriber loop 3 and a capacitor 7 connected between windings 6a and 6b.

As with the prior art arrangement, the junction of winding 6a and capacitor 7 is connected to ground through a 200 ohm resistor 8. However, the 200 ohm resistor 9 and current limiter 10 of the prior arrangement are replaced with a current limit circuit in series with a loop feed resistor 70 having a resistance of 199.7 ohms.

The current limit circuit includes a low ON resistance power MOS FET 52 the drain of which is connected to resistor 70 and the source of which is connected to the $-52$ volt battery. The 0.1 BF capacitor 68 is connected between the drain and gate of FET 52 as in the embodiment of FIG. 2.

The second embodiment uses a different control arrangement for controlling the power FET 52 from that of the first embodiment of FIG. 2. Two voltage dividers including resistors 72 and 74 and resistors 76 and 78, respectively, are connected between the line side of battery feed resistor 70 and the ground side of battery feed resistor 8 and the battery side of battery feed resistor 70 and the line side of battery feed resistor 8, respectively. A first operational amplifier 80 has a noninverting input connected to the junction of resistors 72 and 74 and an inverting input connected to the junction of resistors 76 and 78. The noninverting input of operational amplifier 80 is connected to $-52$V battery via a resistor 82. The inverting input of operational amplifier 80 is connected to its output via a resistor 84. A second operational amplifier 86 has an inverting input connected to the output of operational amplifier 80, and a noninverting input connected to a reference potential. The reference potential is provided at the junction of a resistor 88 connected to ground and a zener diode 90 connected to $-52$V battery. The output of operational amplifier 86 is connected to the gate of power FET 52 via a resistor 92.

In operation, a voltage signal proportional to the loop current is generated by the operational amplifier 80 and voltage divider resistors 72, 74, 76 and 78 at a node 94. In the embodiment of FIG. 4, the scaling factor for operational amplifier 80 is K=0.1 V/mA of loop current. The signal output by operational amplifier 80 is compared to the reference voltage by operational amplifier 86. The output of operational amplifier 86 controls the gate to source voltage of power MOSFET 52 and as the overall feedback is negative, the following equation is forced to be true by the circuit:

$$V_{ref} = k\, I_{loop}$$

$$\text{hence } I_{loop} = \frac{V_{ref}}{k} \text{ for } V_{ref} = 4\text{ V}, k = 0.1\text{ V/mA}$$

$$= \frac{4\text{ V}}{0.1\text{ V/mA}} = 40\text{ mA}$$

Thus, the loop current $I_{loop}$ is limited to 40 mA. The current limit value is a design parameter that may be changed by changing either $V_{ref}$ or K.

The cutoff frequency, $f_1$, in the second embodiment is determined by the time constant for the capacitor 68 and the resistor 92. For $C_{68}=0.1$ $\mu$F and $R_{92}=200$ k the time constant provides a cutoff frequency of about 20 Hz.

The remainder of the circuit features are as described with regard to the embodiment of FIG. 2.

Numerous modifications, variations and adaptations may be made to the particular embodiments of the invention described above without departing from the scope of the invention, which is defined in the claims.

What is claimed is:

1. A battery feed arrangement for a telephone subscriber loop comprising:
   inputs for connection to power supply terminals;
   outputs for connection to a subscriber loop;
   a first battery feed resistor connected between one input and one output;
   a second battery feed resistor, having a value less than the first battery feed resistor, connected to the other output;
   a power FET having a control terminal and a controllable DC resistive path series connected with the second battery feed resistor and coupled to the other input;
   a capacitor connected between the control terminal and the resistive path of the power FET for a low impedance path for AC signals applied at the other output; and
   a control circuit connected to the control terminal of the power FET and having a loop current sensing subcircuit and a biasing subcircuit for providing a control voltage to the power FET in dependence upon the loop current;
   the control voltage having a first value for maintaining the controllable resistive path in a low resistance state when the loop current is below a predetermined threshold and a second value for increasing the controllable resistive path to a higher resistance state to maintain the loop current at the predetermined threshold.

2. A battery feed arrangement as claimed in claim 1 wherein the loop current sensing subcircuit includes a current sensing resistor in series with the power FET.

3. A battery feed arrangement as claimed in claim 2 wherein the biasing circuit includes a bipolar transistor controlling the gate of the power FET.

4. A battery feed arrangement as claimed in claim 3 further comprising a low pass filter connected between the other input and the base of the bipolar transistor.

5. A battery feed arrangement as claimed in claim 1 wherein the predetermined threshold of the loop current is in the range 18–50 mA.

6. A battery feed arrangement as claimed in claim 1 wherein the loop current sensing subcircuit includes first and second voltage dividers connected diagonally across the first and second battery feed resistors.

7. A battery feed arrangement as claimed in claim 6 wherein the loop current sensing subcircuit includes an amplifier connected to the first and second voltage dividers.

8. A battery feed arrangement as claimed in claim 7 wherein the biasing subcircuit includes an amplifier having an inverting input and a noninverting input, the inverting input connected to the output of the loop current sensing amplifier and the noninverting input connected to a reference potential.

* * * * *